US012162272B2

(12) United States Patent
Yamada

(10) Patent No.: US 12,162,272 B2
(45) Date of Patent: Dec. 10, 2024

(54) ROLL PAPER PRINTER

(71) Applicant: SEIKO EPSON CORPORATION, Tokyo (JP)

(72) Inventor: Koji Yamada, Okaya (JP)

(73) Assignee: SEIKO EPSON CORPORATION (JP)

( * ) Notice: Subject to any disclaimer, the term of this patent is extended or adjusted under 35 U.S.C. 154(b) by 188 days.

(21) Appl. No.: 18/072,129

(22) Filed: Nov. 30, 2022

(65) Prior Publication Data

US 2023/0166540 A1 Jun. 1, 2023

(30) Foreign Application Priority Data

Dec. 1, 2021 (JP) ................................. 2021-195272

(51) Int. Cl.
*B41J 15/04* (2006.01)

(52) U.S. Cl.
CPC .................................... *B41J 15/04* (2013.01)

(58) Field of Classification Search
CPC ...... B41J 15/04; B41J 11/0095; B41J 15/042; B41J 15/044; B41J 29/393
See application file for complete search history.

(56) References Cited

U.S. PATENT DOCUMENTS

2006/0269348 A1 11/2006 Nagata
2011/0044746 A1 2/2011 Nagata
2021/0060987 A1* 3/2021 Tokuda ................. B41J 15/046

FOREIGN PATENT DOCUMENTS

JP 2010-006612 A 1/2010

* cited by examiner

*Primary Examiner* — Lisa Solomon
(74) *Attorney, Agent, or Firm* — Harness, Dickey & Pierce, P.L.C.

(57) ABSTRACT

A roll paper printer includes a container that can accommodate a roll paper around which a recording paper sheet is wound with its first surface facing outward. A transport roller pulls the recording paper sheet from the roll paper and then transports the recording paper sheet in a transport direction. A guide can be in contact with a second surface of the recording paper sheet at a location upstream of the transport roller in the transport direction. A projection can be in contact with the first surface of the recording paper sheet at another location upstream of the transport roller in the transport direction and move toward the guide. A lever can be accommodated in the projection and move in contact with the first surface of the recording paper sheet. A sensor is accommodated in the projection and detects motion of the lever.

7 Claims, 4 Drawing Sheets

ROLL PAPER PRINTER

The present application is based on, and claims priority from JP Application Serial Number 2021-195272, filed Dec. 1, 2021, the disclosure of which is hereby incorporated by reference herein in its entirety.

BACKGROUND

1. Technical Field

The present disclosure relates to roll paper printers.

2. Related Art

As disclosed in JP-A-2010-006612, a known apparatus includes: a first mechanism for adjusting the tension of a paper sheet pulled from a roll paper; a second mechanism for detecting the paper sheet; and a lever that moves so as to draw a rotation trajectory inside the first mechanism to detect the paper sheet.

In the disclosed apparatus, the configurations of the first and second mechanisms are complicated and have large volumes. Therefore, the apparatus needs a large inner space to accommodate them, which may lead to upsizing of the outer body.

SUMMARY

The present disclosure is a roll paper printer that includes a container configured to accommodate a roll paper. A transport roller is configured to pull a recording paper sheet from the roll paper and is configured to transport the recording paper sheet in a transport direction, wherein the recording paper sheet has a first surface and a second surface. A guide is configured to be in contact with the second surface of the recording paper sheet and is disposed upstream of the transport roller in the transport direction. A projection is configured to be in contact with the first surface of the recording paper sheet and is disposed upstream of the transport roller in the transport direction and is configured to move toward the guide. A lever is configured to be accommodated in the projection and is configured to move in contact with the first surface of the recording paper sheet. A sensor is accommodated in the projection and is configured to detect motion of the lever.

DESCRIPTION OF EXEMPLARY EMBODIMENTS

1. First Embodiment

1-1. Configuration of Roll Paper Printer

With reference to FIGS. 1 to 5, a roll paper printer 1 according to some embodiments of the present disclosure will be described below. Hereinafter, directions in each drawing will be described in accordance with a three-dimensional (3D) coordinate system. More specifically, the positive direction along the Z-axis is defined as the upper direction, whereas the negative direction is defined as the lower direction. Likewise, the positive direction along the X-axis is defined as the right direction, whereas the negative direction is defined as the left direction. The positive direction along the Y-axis is defined as the forward direction, whereas the negative direction is defined as the rearward direction.

In one embodiment, for example, the roll paper printer 1 may be applied to a point-of-sale (POS) system, which is usually installed in a sales outlet such as a shopping mall, a department store, a convenience store, or an onboard shop or in an eating house such as a restaurant, a café, or a bar. When applied to a POS system, the roll paper printer 1 may print out receipts, coupons, or tickets related to products and/or services to be provided.

Figure 1:
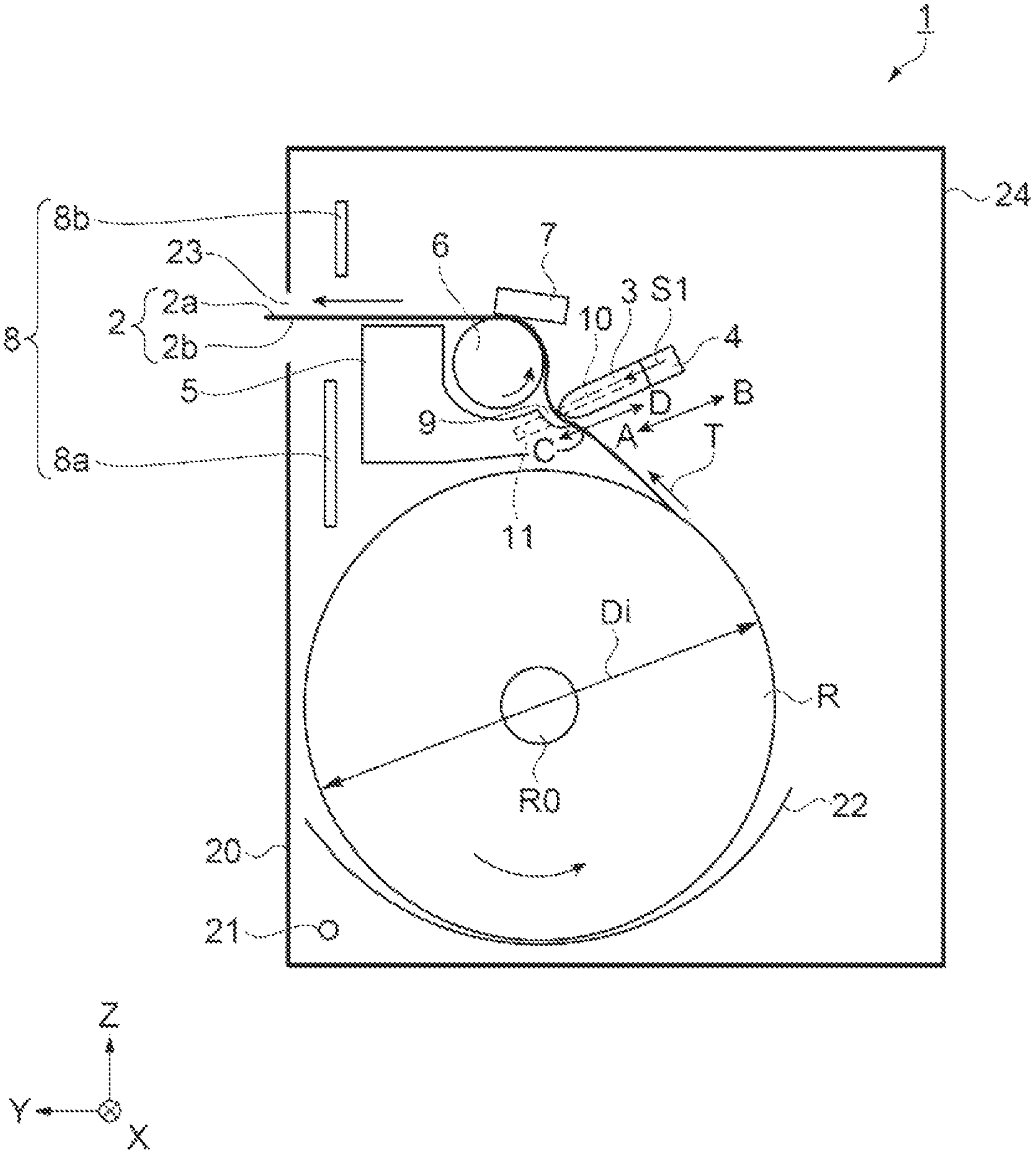
FIG. 1 is a cross-sectional view of a roll paper printer when a recording paper sheet is present on a transport route therein.

As illustrated in FIG. 1, the roll paper printer 1 includes: a projection 3 that can accommodate a lever 10; a guide 5; a transport roller 6; a head 7; and a cutter 8. Furthermore, the roll paper printer 1 includes: a case 24 that has a hinge 21 at a lower front location; and a cover 20 that is rotatable around the hinge 21. Further, the case 24 is provided with the projection 3, the head 7, a second blade 8*b* of the cutter 8, and a container 22 (described later). The cover 20 is provided with the guide 5, the transport roller 6, and a first blade 8*a* of the cutter 8. The guide 5 has a notch 11 (described later).

A recording paper sheet 2, which may be an elongated thermal paper sheet, has a front surface 2*a* and a rear surface 2*b*. The front surface 2*a*, on which images are to be printed by the head 7, is coated with a heat-sensitive material; the rear surface 2*b* is to be brought into contact with the transport roller 6. A roll paper R, which may be a roll of the recording paper sheet 2, is wound around a core R0 with the front surface 2*a* of the recording paper sheet 2 facing outward and the rear surface 2*b* facing inward. The curling of the recording paper sheet 2 wound therearound becomes stronger toward the core R0 of the roll paper R, namely, toward a shorter-outer-diameter portion of the roll paper R. Hereinafter, the outer diameter is referred to simply as the diameter. The width of the recording paper sheet 2 may be 80 mm; however, it may also be 58 mm. The thickness of the recording paper sheet 2 may be 0.06 to 0.08 mm. A diameter Di of the roll paper R may be 80 mm; the diameter of the core R0 may be 18 mm. Hereinafter, the diameter Di of the roll paper R is referred to simply as the diameter Di.

The container 22 is disposed inside a lower portion of the case 24 and can accommodate the roll paper R. The cover 20 is used to expose or hide the container 22. A user can access the container 22 by opening the cover 20 forward. In addition, the user can load the recording paper sheet 2 into the roll paper printer 1 by opening the cover 20, placing the roll paper R in the container 22, pulling the recording paper sheet 2 from the roll paper R, and closing the cover 20.

When the cover 20 is closed, the guide 5 provided in the cover 20 faces the projection 3 provided in the case 24 with the recording paper sheet 2 therebetween. In this arrangement, the guide 5 can be in contact with the rear surface 2*b* of the recording paper sheet 2, whereas the projection 3 can be in contact with the front surface 2*a* thereof. Both the guide 5 and the projection 3 define a transport route 9 (described later) along which the recording paper sheet 2 is to be transported. The transport route 9 is curved between the guide 5 and the projection 3. When the recording paper sheet 2 is transported to the transport route 9 with the cover 20 closed, the recording paper sheet 2 comes into contact with the lever 10, which then turns on a switch 13. In this way, the roll paper printer 1 can inform the user that the recording paper sheet 2 is present on the transport route 9. Details of this will be described later.

When the cover 20 is closed, the transport roller 6 provided in the cover 20 faces the head 7 provided in the case 24 with the recording paper sheet 2 therebetween. In this arrangement, the transport roller 6 can transport the recording paper sheet 2 while keeping in contact with the rear surface 2*b*, whereas the head 7 can print images on the front surface 2*a* of the recording paper sheet 2 while keeping in contact with the front surface 2*a*. Since the transport roller 6 faces the head 7 between the recording paper sheet 2 therebetween, the transport roller 6 may also be referred to as the platen roller.

The first blade 8*a* of the cutter 8 provided in the cover 20 faces the second blade 8*b* of the cutter 8 provided in the case 24 with the recording paper sheet 2 therebetween. When the recording paper sheet 2 is present between the first blade 8*a* and the second blade 8*b*, the first blade 8*a* can cut it out by moving to the second blade 8*b*. When the cover 20 is closed, an ejection hole 23 having a rectangular shape is defined on the boundary between the cover 20 and the case 24.

The head 7 may be a line-type thermal head in which a plurality of heating elements are arrayed in the +X direction. The heating elements in the head 7 can be selectively heated based on print data and print images on the front surface 2*a* of the recording paper sheet 2. It should be noted that the recording paper sheet 2 is a thermal paper sheet in this case.

The transport roller 6 is rotated by a dedicated motor (not illustrated) in the direction of the arrow in FIG. 1, or counterclockwise on the page of FIG. 1. The transport roller 6 pulls the recording paper sheet 2 from the roll paper R disposed in the container 22 and then transports it in a transport direction denoted by the arrow, which is a direction from the transport route 9 to the ejection hole 23 via the transport roller 6, the head 7, and the cutter 8. In this case, the roll paper R also rotates in the direction of the arrow, or counterclockwise, in response to the pulling of the recording paper sheet 2. As seen from the transport direction, the container 22, the transport route 9 formed by both the guide 5 and the projection 3, the transport roller 6, the head 7, the cutter 8, and the ejection hole 23 are arranged in this order.

The projection 3 can move in a direction A and a direction B, which are opposite to each other. In this case, the direction A corresponds to a first direction, whereas the direction B corresponds to a second direction. More specifically, the projection 3 can move in the direction A toward the guide 5 and also move in the direction B away from the guide 5. The projection 3 is mounted on one or more first elastic members 4 while receiving pushing force S1 from the first elastic members 4 in the direction A. In this case, each first elastic member 4 may be made of a stretchable material such as a spring or a rubber. As an example, each first elastic member 4 is a compressed coil spring. First ends of the first elastic members 4 are fixed to the case 24, so that the first elastic members 4 can push the projection 3 in the direction A via second ends thereof.

The projection 3 is designed to move a distance of up to 6.0 mm in the direction B from a reference location at which the projection 3 is positioned when the recording paper sheet 2 is not present on the transport route 9 and thus not in contact with the projection 3. This distance is equivalent to the amount in which the first elastic members 4 can be compressed. The projection 3 is widened in the ±X directions, or along the width of the recording paper sheet 2. The width of the projection 3 may be 80 mm, which is substantially equal to the width of the recording paper sheet 2. As an example, at least two first elastic members 4 are disposed near the ±X-sides of the projection 3. Disposing the first elastic members 4 in this manner enables the projection 3 to equally transfer the pushing force S1 from the first elastic members 4 to the recording paper sheet 2 across the width thereof. Similar to the projection 3, the guide 5 is also widened across the width of the recording paper sheet 2.

When pulled from the roll paper R by the transport roller 6, a tension T acts on the recording paper sheet 2 in the direction of the arrow, which is identical to the transport direction. As a result of the action of the tension T, the recording paper sheet 2 pushes the projection 3 in the direction B. In short, virtue of the tension T, the recording paper sheet 2 comes into contact with the projection 3, thereby pushing the projection 3 in the direction B.

The lever 10 accommodated in the projection 3 pivots in response to the contact with the front surface 2*a* of the recording paper sheet 2. The lever 10 is pivotable in a direction C and a direction D, which are opposite to each other. In this case, the direction C corresponds to a third direction, whereas the direction D corresponds to a fourth direction. The guide 5 has the notch 11 formed in a location opposite the lever 10 that can protrude from the projection 3 when the cover 20 is closed. In this case, the notch 11 may be a hole or a groove. The lever 10 can move in the direction C toward the notch 11 of the guide 5 and also move in the direction D away from the notch 11.

1-2. Configuration for Detecting Recording Paper Sheet

Figure 2:
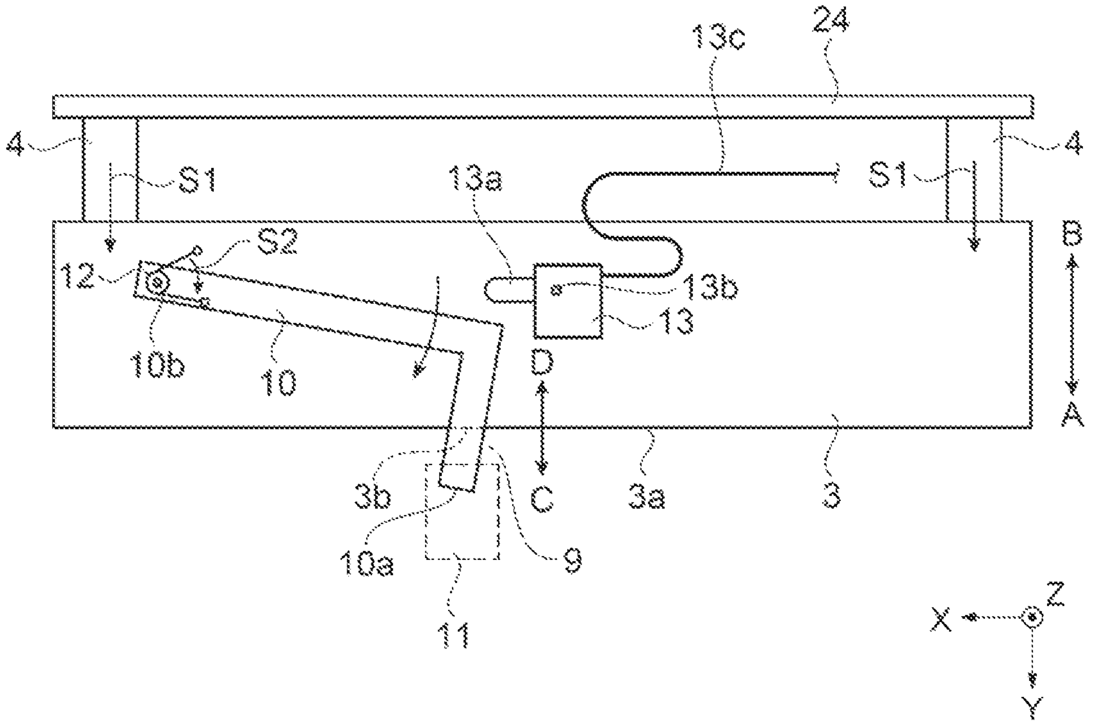
FIG. 2 is an enlarged plan view of the projection and some surrounding components in the roll paper printer when a recording paper sheet is not present on the transport route.
Figure 3:
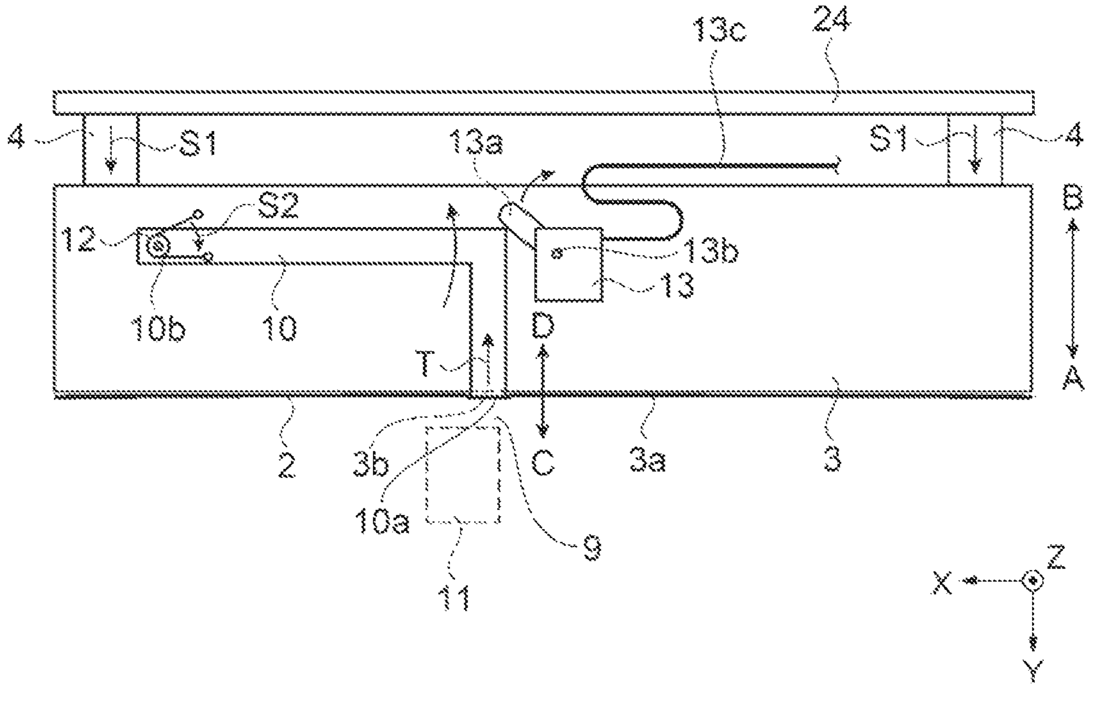
FIG. 3 is an enlarged plan view of the projection and the surrounding components in the roll paper printer when a recording paper sheet is present on the transport route.

FIG. 2 illustrates the projection 3 and some surrounding components when the recording paper sheet 2 is not present on the transport route 9; FIG. 3 illustrates the projection 3 and the surrounding components when the recording paper sheet 2 is present on the transport route 9. In comparison with FIGS. 2 and 3, a configuration of detecting the recording paper sheet 2 will be described below. It should be noted that FIGS. 2 and 3 illustrate the notch 11 but do not illustrate the guide 5 for the sake of convenience.

As illustrated in FIG. 2, the lever 10 has an L-shape, which is formed by two linear portions: the first linear portion extends in the +X direction, and the second linear portion extends in the +Y direction. The second linear portion of the lever 10 has a lever end 10*a* to be in contact with the front surface 2*a* of the recording paper sheet 2, whereas the first linear portion thereof has a shaft 10*b* attached to the projection 3. The lever 10 can be accommodated in the projection 3 so as to be rotatable around the shaft 10*b*.

The lever 10 is attached to a second elastic member 12, which is accommodated in the projection 3. The second elastic member 12 may be a spring or a rubber. As an example, the second elastic member 12 is a torsion coil spring. If the second elastic member 12 is a torsion coil spring, a first end of the torsion coil spring may be fixed to the projection 3, whereas a second end thereof is attached to the lever 10. The second elastic member 12 generates a pushing force S2, which acts on the lever 10 in the direction of the arrow, or clockwise around the shaft 10*b*. As a result of the action of the pushing force S2 on the second elastic member 12, the lever end 10*a* of the lever 10 moves toward the guide 5 in the direction C. In this case, the pushing force S2 generated by the second elastic member 12 may be smaller than the pushing force S1 generated by the first elastic members 4.

When the recording paper sheet 2 is not present on the transport route 9 as in the example of FIG. 2, namely, when the lever end 10*a* is not in contact with the recording paper sheet 2, the lever end 10*a* is displaced toward the direction C side by virtue of the pushing force S2 from the second elastic member 12. More specifically, the lever end 10*a* protrudes over the transport route 9 from a projecting side 3*a* of the projection 3 via an aperture 3*b* formed at the projecting side 3*a* and is inserted into the notch 11 of the guide 5.

The switch 13, which acts as a sensor, is accommodated in the projection 3. The switch 13 having a switch lever 13*a* is disposed inside the projection 3 so that the switch lever 13*a* can be in contact with the lever 10. The switch lever 13*a* is pivotable around a switch shaft 13*b* in the switch 13. The switch 13 contains two metal contacts. In a normal state where the switch lever 13*a* does not pivot, the metal contacts are separated from each other so that the switch 13 is kept off. When the switch lever 13*a* pivots, the metal contacts come into contact with each other so that the switch 13 is turned on. It should be noted that the mechanism for turning on or off the switch 13 may work in a manner opposite to the above.

When the recording paper sheet 2 is not present on the transport route 9 as in the example of FIG. 2, namely, when the lever end 10*a* is not in contact with the recording paper sheet 2, the lever 10 is displaced toward the direction C side. In this case, the lever 10 is not in contact with the switch lever 13*a*, and thus the switch lever 13*a* does not pivot, thereby keeping the switch 13 off. The switch 13 is electrically connected, via a switch cable 13*c*, to a central processing unit (CPU) (not illustrated) that controls individual units constituting the roll paper printer 1 in an integrated manner. In this case, the CPU acquires information indicating the OFF state of the switch 13 via the switch cable 13*c* and determines that the recording paper sheet 2 is not present on the transport route 9. In this way, the switch 13 is turned on or off, depending on the position of the lever 10, thereby enabling the motion of the lever 10 to be detected.

As illustrated in FIG. 2, first ends of the first elastic members 4 are fixed to the case 24. Thus, when the recording paper sheet 2 is not present on the transport route 9, namely, when the tension T does not act on the recording paper sheet 2, second ends of the first elastic members 4 keep the projection 3 displaced from the case 24 in the direction A by virtue of the pushing force S1. Meanwhile, the second elastic member 12 keeps the lever end 10*a* displaced from the projection 3 in the direction C by virtue of the pushing force S2. In this way, both the projection 3 and the lever end 10*a* are displaced together from the case 24 in the direction A by the first elastic members 4, and the lever end 10*a* is further displaced from the case 24 in the direction C by the second elastic member 12.

The motion of the lever end 10*a* in both directions C and D forms an arc-shaped trajectory centered at the location of the shaft 10*b*. The lever end 10*a* can move a distance of up to 5.0 mm in the direction D from a reference location at which the lever end 10*a* is positioned when the recording paper sheet 2 is not present on the transport route 9 and thus is not in contact with the lever end 10*a*. For example, if the recording paper sheet 2 is 80 mm wide, the lever end 10*a* can be positioned at substantially the center of the recording paper sheet 2 in a width direction. The radium of the circular trajectory drawn when the first linear portion of the lever 10 rotates around the shaft 10*b* is approximately a half of 80 mm, which is equal to the width of the recording paper sheet 2. As described above, the radium of the circular trajectory along which the first linear portion of the lever 10 rotates around the shaft 10*b* is approximately 40 mm, which is about eight times as long as, namely, much longer than 5.0 mm, which is equal to the segment length of the movement trajectory of the lever end 10*a*. Therefore, the motion trajectory of the lever end 10*a* in the directions C and D can be approximated as being linear.

In consideration of the above, the direction A in which the projection 3 is movable and the direction C in which the lever end 10*a* is movable can be regarded as the same direction. Likewise, the direction B in which the projection 3 is movable and the direction D in which the lever end 10*a* is movable can also be regarded as the same direction. In short, when the recording paper sheet 2 is not present on the transport route 9, namely, when the tension T does not act on the recording paper sheet 2, both the lever end 10*a* and the projection 3 are displaced together from the case 24 in the direction A by the first elastic members 4, and the lever end 10*a* is further displaced from the case 24 in the direction C, which can be identical to the direction A, by the second elastic member 12.

When the recording paper sheet 2 is transported to the transport route 9 as in the example of FIG. 3, the recording paper sheet 2 comes into contact with the lever end 10*a*, thereby moving it from the location (see FIG. 2), at which the lever end 10*a* is inserted into the notch 11 of the guide 5. It should be noted that the pushing force S2 generated by the second elastic member 12 is smaller than the force at which the tension T acts on the recording paper sheet 2 to push it in the direction D. Furthermore, as described above, the pushing force S2 generated by the second elastic member 12 is smaller than the pushing force S1 generated by the first elastic members 4.

When the recording paper sheet 2 comes into contact with the lever end 10*a* on the transport route 9, the lever end 10*a* is first pushed by the recording paper sheet 2 by virtue of the tension T and is then moved in the direction D against the pushing force S2 from the second elastic member 12. After that, the lever end 10*a* reaches the aperture 3*b* at the projecting side 3*a* of the projection 3. In this case, the recording paper sheet 2 comes into contact with both the projecting side 3*a* and the lever end 10*a*, thereby accommodating the lever 10 including the lever end 10*a* in the projection 3.

As the tension T acting on the recording paper sheet 2 increases, the projection 3 is further pushed and moved in the direction B against the pushing force S1 from the first elastic members 4. As a result, the lever end 10*a* is pushed by the recording paper sheet 2 by virtue of the tension T and moved toward the case 24 in the direction D. The lever end 10*a* is then moved together with the projection 3 in the direction B.

When the recording paper sheet 2 comes into contact with the lever end 10*a* on the transport route 9, the lever end 10*a* is moved in the direction D by the recording paper sheet 2 by virtue of the tension T. In response, the lever 10 is pivoted counterclockwise around the shaft 10*b* as indicated by the arrow and then comes into contact with the switch lever 13*a*. The switch lever 13*a* is then pivoted clockwise around the switch shaft 13*b* until the metal contacts in the switch 13 come into contact with each other, thereby turning on the switch 13. The CPU acquires the information indicating the ON state of the switch 13 and determines that the recording paper sheet 2 is present on the transport route 9.

Since the transport direction in which the recording paper sheet 2 is transported along the transport route 9 is an upward direction, the lever end 10*a* may have a surface inclining up in the transport direction, thereby allowing the recording paper sheet 2 to smoothly come into contact with the lever end 10*a*. Alternatively, the lever end 10*a* may have a predetermined curvature in the transport direction.

There are cases where some paper crumbs of the recording paper sheet 2 enter the projection 3 via the aperture 3*b* formed on the projecting side 3*a* through which the lever end 10*a* passes. In such cases, the paper crumbs may be adhered to the metal contacts in the switch 13, thereby adversely affecting the operation of the switch 13. To suppress such disadvantages, the switch 13 may be disposed inside the projection 3 at a location apart from the aperture 3*b* but close to the case 24 in the direction D. In addition, the second linear portion of the lever 10 which is to be brought into contact with the switch 13 may extend vertically, and the switch 13 may be disposed so as to deviate from the extension of the motion trajectory of the lever end 10*a* which extends in the direction D. This configuration reduces the risk of the lever end 10*a* carrying paper crumbs into the switch 13. Moreover, a cover (not illustrated) may be disposed over the projection 3 illustrated in FIG. 3, thereby hiding the entire projection 3 except the aperture 3*b*. This configuration suppresses paper crumbs from entering the projection 3 through any portion other than the aperture 3*b*.

The projection 3 moves in the direction A or B, depending on the presence/absence of the recording paper sheet 2 on the transport route 9 and variations in the tension T of the recording paper sheet 2. In response to the movement of the projection 3, the switch 13 accommodated in the projection 3 also move in the direction A or B. In this case, a first end of the switch cable 13*c* which is fixed to the case 24 or any other member and electrically connected to the CPU does not move, whereas a second end thereof which is electrically connected to the switch 13 moves together with the switch 13. When moving together with both the projection 3 and the switch 13, the second end of the switch cable 13*c* is stressed or kinked. If the switch cable 13*c* is short and thus strongly stressed, it may break. As illustrated in FIG. 3, however, the switch cable 13*c* is curved at several points in directions perpendicular to the directions A and B so that the switch cable 13*c* is sufficiently slacked. Slacking the switch cable 13*c* in this manner mitigates the kinking of the projection 3 and stress acting on the projection 3, thereby reducing the risk of the switch cable 13*c* breaking.

1-3. Configuration for Relaxing Tension of Recording Paper Sheet

Figure 4:
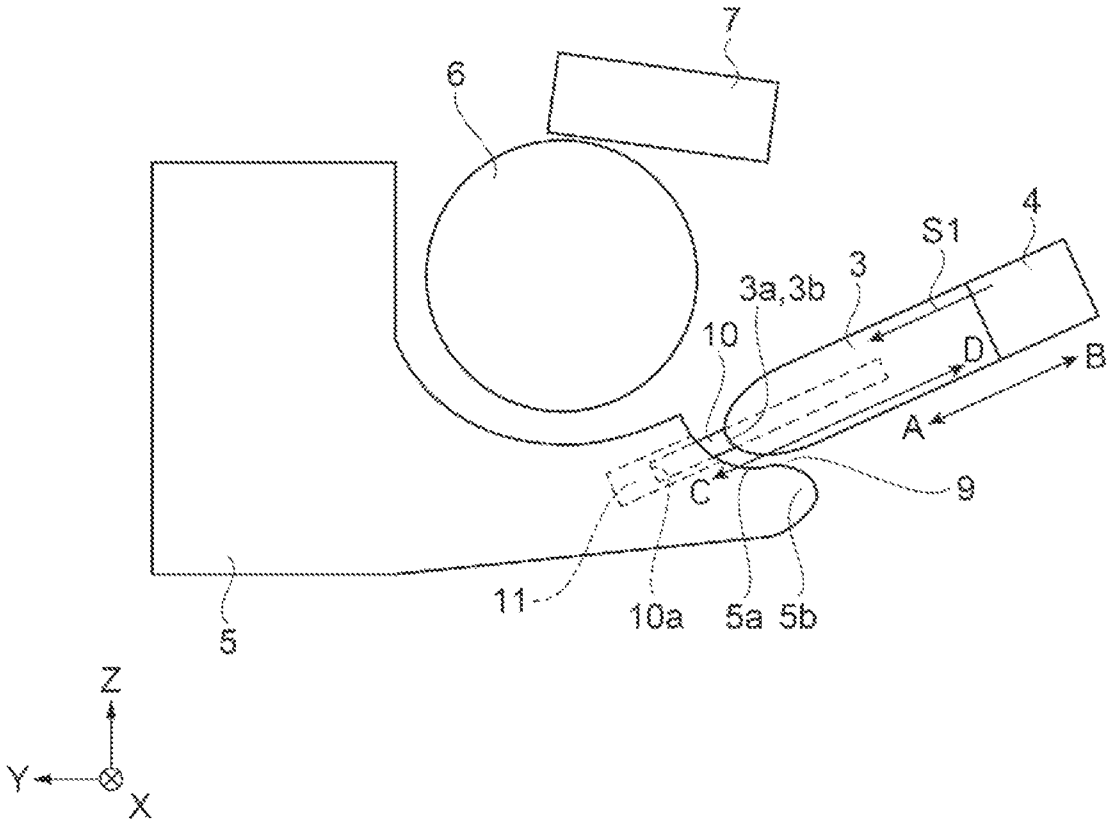
FIG. 4 is an enlarged cross-sectional view of the projection and the surrounding components in the roll paper printer when a recording paper sheet is not present on the transport route.
Figure 5:
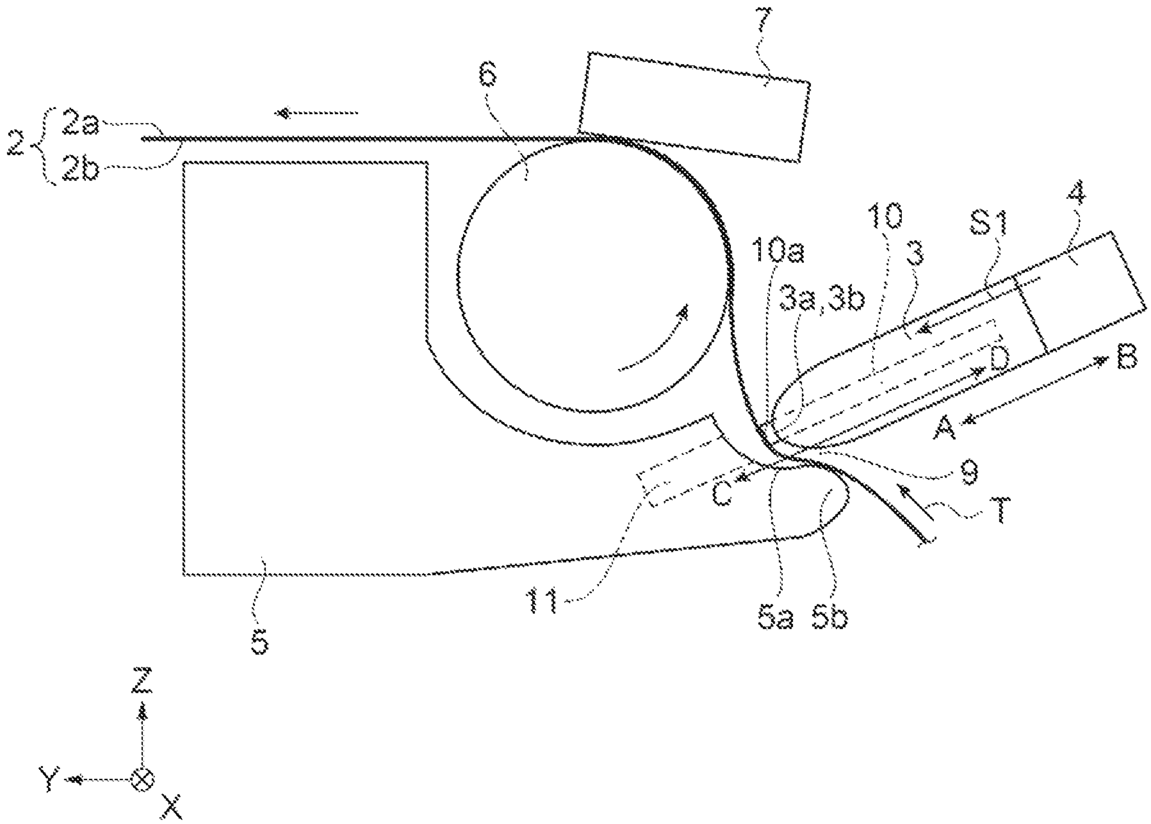
FIG. 5 is an enlarged cross-sectional view of the projection and the surrounding components in the roll paper printer when a recording paper sheet is present on the transport route.

FIG. 4 illustrates the projection 3 and the surrounding components when the recording paper sheet 2 is not present on the transport route 9; FIG. 5 illustrates the projection 3 and the surrounding components when the recording paper sheet 2 is present on the transport route 9. In comparison with FIGS. 4 and 5, a configuration of relaxing the tension T of the recording paper sheet 2 will be described below.

With reference to FIG. 4, the transport route 9 formed between the guide 5 and the projection 3 will be mainly described below. The guide 5 includes a bump 5*b* and a recess 5*a* continuously arranged in this order in the transport direction. Of the guide 5, the recess 5*a* is also referred to as the depression, and the bump 5*b* is also referred to as the bulge. The recess 5*a* of the guide 5 is provided with the notch 11, which is positioned opposite the aperture 3*b* at the projecting side 3*a* of the projection 3.

In the example of FIG. 4, the recording paper sheet 2 is not present on the transport route 9. Thus, the tension T does not act on the recording paper sheet 2. The projection 3 is displaced toward the direction A side by virtue of the pushing force S1 from the first elastic members 4. Likewise, the lever 10 accommodated in the projection 3 is displaced toward the direction C side by virtue of the pushing force S2 from the second elastic member 12.

When the recording paper sheet 2 is not present on the transport route 9, as described above, both the projection 3 and the lever end 10*a* of the lever 10 are displaced from the case 24 in the direction A. Along with the displacement of the lever 10 in the direction C, the lever end 10*a* is displaced into the notch 11 of the recess 5*a* in the guide 5. More specifically, the lever end 10*a* protrudes over the transport route 9 from the projecting side 3*a* of the projection 3 via the aperture 3*b* and is inserted into the notch 11. In this case, as described above, the lever 10 is apart from the switch lever 13*a* of the switch 13, namely, is not in contact with the switch lever 13*a*, thereby keeping the switch 13 off. The CPU acquires the information indicating the OFF state of the switch 13 and determines that the recording paper sheet 2 is not present on the transport route 9.

When transported to the transport route 9 as in the example of FIG. 5, the recording paper sheet 2 comes into the lever end 10*a* of the lever 10 which has been inserted into the notch 11. In this case, after the recording paper sheet 2 has been pulled from the roll paper R by the transport roller 6, the rear surface 2*b* comes into contact with the bump 5*b* of the guide 5, and then the front surface 2*a* comes into contact with the projecting side 3*a* of the projection 3 disposed downstream of the bump 5*b* in the transport direction. In this way, the recording paper sheet 2 is transported. As described above, the transport route 9 formed by the guide 5 and the projection 3 is curved. Thus, the recording paper sheet 2 being transported along the transport route 9 is warped.

The example of FIG. 5 differs from that of FIG. 4 in that the tension T of the recording paper sheet 2 acts on both the lever 10 and the projection 3. When the tension T of the recording paper sheet 2 acts on the projection 3, the lever 10 is first pushed and moved in the direction D against the pushing force S2 from the second elastic member 12. The lever end 10*a* of the lever 10 then reaches the aperture 3*b* on the projecting side 3*a* of the projection 3. As a result, the front surface 2*a* of the recording paper sheet 2 comes into contact with the projecting side 3*a* of the projection 3 while keeping in contact with the lever end 10*a*. Then, when the tension T of the recording paper sheet 2 acts on the projecting side 3*a*, the projection 3 is pushed and moved in the direction B against the pushing force S1 from the first elastic members 4.

When the recording paper sheet 2 is transported to the transport route 9, the recording paper sheet 2 moves the lever end 10*a* of the lever 10 toward the case 24 in the direction D by virtue of the tension T until the lever end 10*a* reaches the aperture 3*b* on the projecting side 3*a* of the projection 3. The recording paper sheet 2 then moves both the lever end 10*a* and projection 3 in the direction B with the front surface 2*a* kept in contact with both the lever end 10*a* and the projecting side 3*a*. In this case, as described above, the lever 10 comes into contact with the switch lever 13*a* of the switch 13, thereby turning on the switch 13. The CPU can acquire information indicating the ON state of the switch 13 and determines that the recording paper sheet 2 is present on the transport route 9.

On the other hand, if the roll paper R has a large diameter Di and a heavy weight, a heavy load may be placed on the transport roller 6, and a high tension T may act on the recording paper sheet 2 when the transport roller 6 transports the recording paper sheet 2. As an example, the diameter Di is initially 80 mm and may decrease to 30 mm with the use of the roll paper R. Therefore, when a new roll paper R having the maximum weight and diameter Di is transported, the heaviest load may be placed on the transport roller 6, and the highest tension T may act on the recording paper sheet 2.

If the roll paper R has a large diameter Di and a heavy weight, when the transport roller 6 starts transporting the recording paper sheet 2, a heavy load is suddenly placed on the transport roller 6, and a high tension T suddenly acts on the recording paper sheet 2, due to the law of inertia. Such a heavy load on the roll paper R and inertia may hinder the transport roller 6 from appropriately starting to transport the recording paper sheet 2.

As illustrated in FIG. 5, when the front surface 2*a* of the recording paper sheet 2 comes into contact with the projection 3, the recording paper sheet 2 moves the projection 3 in the direction B by virtue of the tension T. However, the pushing force S1 generated by the first elastic member 4 simultaneously acts on the projection 3 in the direction A, thereby relaxing the tension T. More specifically, whereas the tension T of the recording paper sheet 2 acts on the recording paper sheet 2 to push the projection 3 in the direction B, the pushing force S1 generated by the first elastic members 4 acts on the projection 3 to push back the recording paper sheet 2 in the opposite direction, or in the direction A. In this way, both of the tension T and the pushing force S1 that act on the recording paper sheet 2 are canceled out.

The pushing force S1 generated by the first elastic members 4 increases as the projection 3 moves in the direction B to compress the first elastic members 4. In short, as the transport roller 6 applies a higher tension T to the recording paper sheet 2 to push the projection 3 in the direction B, the first elastic members 4 generate a larger pushing force S1 to push back the first elastic members 4 in the direction A. In this way, the projection 3 successfully helps to relax the tension T of the recording paper sheet 2 in accordance with the tension T, namely, the diameter Di.

As described above, the transport roller 6 can stably transport the recording paper sheet 2 independently of the diameter Di. More specifically, the transport roller 6 can stably transport the recording paper sheet 2 by relaxing the tension T with the projection 3, even when a high tension T suddenly acts on the recording paper sheet 2 due to the influence of the inertia at the start of the transportation of the recording paper sheet 2.

When the projection 3 moves while relaxing the tension T of the recording paper sheet 2, for example, at the start of the transport of the recording paper sheet 2 with the transport roller 6, both the lever end 10*a* and the projecting side 3*a* of the projection 3 are still kept in contact with the front surface 2*a* of the recording paper sheet 2. In such cases, the lever 10 can keep in contact with the switch lever 13*a* of the switch 13, thereby maintaining the ON state of the switch 13. The CPU thus acquire information indicating the ON state of the switch 13 and determines that the recording paper sheet 2 is present on the transport route 9.

As described above, when the transport roller 6 rotates counterclockwise to pull the recording paper sheet 2 from the roll paper R and transport it, the roll paper R also rotates counterclockwise inside the container 22. In this case, the rotation of the roll paper R may vary the load placed on the transport roller 6 during the transport of the recording paper sheet 2 with the transport roller 6, for example, due to varying friction between the roll paper R and the container 22. As a result, the tension T of the recording paper sheet 2 may also vary.

When the diameter Di increases, the tension T largely varies. When the tension T excessively varies, the transport roller 6 may fail to transport the recording paper sheet 2 at a constant speed, which leads to a lowered print quality. As an example, the constant speed at which the transport roller 6 transports the recording paper sheet 2 is 500 mm/sec.

Even in the above case, the projection 3 moves in the direction A or B in accordance with variations of the tension T of the recording paper sheet 2 while reducing the variations in the tension T of the recording paper sheet 2 by virtue of the pushing force S1 from the first elastic members 4. This configuration helps the transport roller 6 transport the recording paper sheet 2 at a constant speed. When the tension T of the recording paper sheet 2 varies, the front surface 2*a* of the recording paper sheet 2 still keeps in contact with both the lever end 10*a* and the projecting side 3*a* of the projection 3. Thus, the lever 10 can also keep in contact with the switch lever 13*a* of the switch 13, thereby maintaining the ON state of the switch 13. In this case, the CPU acquires information indicating the ON state of the switch 13 and determines that the recording paper sheet 2 is present on the transport route 9.

1-4. Configuration for Correcting Curling of Recording Paper Sheet

As described above, the recording paper sheet 2 wound around a portion of the roll paper R which is closer to the core R0, namely, which is smaller in diameter Di tends to be further curled. If the recording paper sheet 2 prints receipts, coupons, or tickets on such a curled recording paper sheet 2, they may also be curled, in which case it is difficult to satisfy desired quality requirements. Moreover, a curled recording paper sheet 2 may be stuck on the cutter 8 or an area around the ejection hole 23 because no components that control the transportation of the recording paper sheet 2 are disposed downstream of both the transport roller 6 and the head 7 in the transport direction.

When the front surface 2*a* of the recording paper sheet 2 comes into contact with the projection 3, the projection 3 may scrub the front surface 2*a* while transferring the pushing force S1 in the direction A from the first elastic members 4 to the recording paper sheet 2. This configuration can appropriately correct curling of a recording paper sheet 2. As the diameter Di decreases, the weight of the roll paper R decreases, and the load placed on the transport roller 6 decreases, during the transport of the recording paper sheet 2. As a result, the tension T of the recording paper sheet 2 also decreases. When the tension T decreases, the first elastic members 4 generate the pushing force S1 to further push the projection 3 in the direction A with the projection 3 kept in contact with the recording paper sheet 2. As a result, the transport route 9 formed between the guide 5 and the projection 3 becomes narrower because the projection 3 has further moved toward the guide 5.

As the transport route 9 becomes narrower, the curvature of the transport route 9 increases, and the transport route 9 is further curved. Thus, as the diameter Di decreases, the projection 3 further moves in the direction A, and the transport route 9 is further curved. This configuration is effective in correcting the curling of the recording paper sheet 2 by warping the recording paper sheet 2 in the opposite direction. In other words, the projection 3 moves in accordance with a change in the roll paper R such as a decrease in the diameter Di. The movement of the projection 3 varies the curvature of the transport route 9 formed between the guide 5 and the projection 3 facing each other. Consequently, this configuration further curves the transport route 9 as the diameter Di decreases and curling of the recording paper sheet 2 thus increases, thereby effectively correcting the curling of the recording paper sheet 2.

While the projection 3 is moving to correct the curling of the recording paper sheet 2, both the lever end 10*a* and the projecting side 3*a* of the projection 3 still keep in contact with the front surface 2*a* of the recording paper sheet 2. In such cases, the lever 10 keeps in contact with the switch lever 13*a* of the switch 13, thereby maintaining the ON state of the switch 13. The CPU acquire information indicating the ON state of the switch 13 and determines that the recording paper sheet 2 is present on the transport route 9.

According to one embodiment of the present disclosure, as described above, a roll paper printer 1 includes a projection 3 configured to be in contact with a front surface 2*a* of a recording paper sheet 2 and to move toward a guide 5. The roll paper printer 1 further include: a lever 10 configured to be accommodated in the projection 3 and to move in contact with the front surface 2*a* of the recording paper sheet 2; and a switch 13 that is accommodated in the projection 3 and detects motion of the lever 10. The roll paper printer 1 has a simple configuration with a small inner volume and a small outer size to be able to adjust a tension T of the recording paper sheet 2 and to detect the recording paper sheet 2. The roll paper printer 1 can also correct curling of the recording paper sheet 2. Furthermore, the lever 10 has a lever end 10*a* to be inserted into a notch 11 formed in the guide 5. This configuration allows the lever 10 to move inside only a small space. When the recording paper sheet 2 is not present on a transport route 9, a portion of the lever 10 protrudes from the projection 3 toward the transport route 9, and the remaining portions thereof are accommodated in the projection 3 and inserted into the notch 11.

It should be noted that concrete components constituting the roll paper printer 1 are not limited to those in the embodiment described with reference to the accompanying drawings, and some of the components may be modified, replaced, or deleted as appropriate without departing from the spirit of the present disclosure.

The roll paper printer 1 may employ any type of print system. Although the head 7 is a thermal head in the foregoing embodiment, the head 7 may be an ink jet head instead. If the head 7 is an ink jet head, the roll paper printer 1 may further include a driven roller inside a case 24 which is disposed opposite the transport roller 6 and pinches the transport roller 6 with the transport roller 6. This is because the head 7 cannot come into contact with the transport roller 6 and cannot pinch the recording paper sheet 2 with the transport roller 6.

The roll paper printer 1 may employ any type of sensor. Although the switch 13, which serves as a sensor, is a mechanical switch with a switch lever 13*a* in the foregoing embodiment, the switch 13 may be a reflective or transmission optical sensor instead. Using even such an optical sensor can detect the position of the lever 10.

The roll paper printer 1 may employ any types of lever and second elastic member. Although the lever 10 has an L-shape and the second elastic member 12 is implemented using a torsion coil spring to generate a pushing force S2 in the foregoing embodiment, the lever 10 may have a linear shape and the second elastic member 12 may be implemented using a compressed coil spring and mounted on the projection 3, similar to the configurations of the projection 3 and the first elastic members 4. In this case, the lever 10 is linearly movable in directions C and D relative to the projection 3, and the second elastic member 12 is linearly stretchable.

Although the first elastic members 4 are fixed to the case 24 in the foregoing embodiment, the first elastic members 4 may be alternatively fixed to the container 22 in which the roll paper R is disposed. In this embodiment, the container 22 (see FIG. 1) may be extended upward so as to be fixed to the first elastic members 4. By fixing the first elastic members 4 to the container 22, the projection 3 mounted on the first elastic members 4 is also fixed to the container 22.

The roll paper printer 1 may further include: a shaft in a lower rear portion of the case 24; and a lever coupled at its first and second ends, respectively, to the shaft and the projection 3. The projection 3 to which the second end of the lever is coupled may move around the shaft. In this case, the first elastic members 4 may push the projection 3 either directly or via the lever.

Although the roll paper printer 1 operates with an ejection hole 23 facing forward in the foregoing embodiment, it may operate with the ejection hole 23 facing upward. In this case, the container 22 (see FIG. 1) may be extended upward so that the container 22 can accommodate the roll paper R when the roll paper printer 1 is placed with the ejection hole 23 facing upward.

Unlike the foregoing embodiment, the printing surface of the recording paper sheet 2 does not necessarily have to be in contact with the projection 3. Accordingly, the recording paper sheet 2 may be wound around the roll paper R with the printing surface facing inward. In this case, the positional relationship between the head 7 and the transport roller 6 needs to be opposite to that illustrated in FIG. 1.

What is claimed is:

1. A roll paper printer comprising:
- a container configured to accommodate a roll paper;
- a transport roller configured to pull a recording paper sheet from the roll paper and configured to transport the recording paper sheet in a transport direction, wherein the recording paper sheet has a first surface and a second surface;
- a guide configured to be in contact with the second surface of the recording paper sheet and disposed upstream of the transport roller in the transport direction;
- a projection configured to be in contact with the first surface of the recording paper sheet and disposed upstream of the transport roller in the transport direction and configured to move toward the guide;
- a lever configured to be accommodated in the projection and configured to move in contact with the first surface of the recording paper sheet; and
- a sensor configured to detect motion of the lever, the sensor being accommodated in the projection.

2. The roll paper printer according to claim 1, wherein the guide has a notch formed at a location opposite the lever.

3. The roll paper printer according to claim 2, wherein the lever is inserted into the notch of the guide when the lever is not in contact with the recording paper sheet.

4. The roll paper printer according to claim 3, wherein
- a transport route having a curved shape is defined between the guide and the projection facing one another, and
- the lever extends over the transport route and is inserted into the notch of the guide.

5. The roll paper printer according to claim 1, further comprising a first elastic member that pushes the projection toward the guide, wherein the projection is pushed in a first direction by the first elastic member and is also pushed in a second direction by the recording paper sheet in virtue of a tension acting on the recording paper sheet, the second direction being opposite to the first direction.

6. The roll paper printer according to claim 1, further comprising a second elastic member that pushes the lever toward the guide, the second elastic member being accommodated in the projection, wherein the lever is pushed in a third direction by the second elastic member and is also pushed in a fourth direction by the recording paper sheet in virtue of the tension acting on the recording paper sheet, the fourth direction being opposite to the third direction.

7. A roll paper printer according to claim 1, further comprising a head that prints an image on the first surface of the recording paper sheet.

* * * * *